Dec. 26, 1967  J. J. TOROK  3,360,353
APPARATUS FOR DRAWING GLASS IN CYLINDRICAL FORM
Filed May 27, 1964  2 Sheets-Sheet 1

INVENTOR.
J. J. TOROK
BY
E. J. Holler
W. A. Schaich
ATTORNEYS

Dec. 26, 1967  J. J. TOROK  3,360,353
APPARATUS FOR DRAWING GLASS IN CYLINDRICAL FORM
Filed May 27, 1964  2 Sheets-Sheet 2

INVENTOR.
J. J. TOROK
BY
E. J. Holler &
W. A. Schaich
ATTORNEYS

United States Patent Office 3,360,353
Patented Dec. 26, 1967

3,360,353
APPARATUS FOR DRAWING GLASS
IN CYLINDRICAL FORM
Julius J. Torok, Toledo, Ohio, assignor to Owens-Illinois,
Inc., a corporation of Ohio
Filed May 27, 1964, Ser. No. 370,473
6 Claims. (Cl. 65—184)

ABSTRACT OF THE DISCLOSURE

This invention relates to apparatus for and method of continuously drawing molten glass in the form of lengthy tubing or rod, the apparatus comprising a downwardly-inclined rotating mandrel having major glass-working surfaces comprised of refractory insulating material with spaced-apart annular electrodes forming a part of the mandrel exterior surfaces for heating the molten glass thereon by Joule effect electrical current passed therethrough to maintain precisely-controlled thermal and viscosity properties in the glass as drawn.

---

This invention relates to improvements in both apparatus and method for continuously drawing tubes, rods or the like of glass or other thermoplastic material. More particularly, the invention pertains to novel apparatus and method for producing high-quality glass tubing and rod of various dimensions having improved chemical and physical characteristics.

The present invention is especially adapted for use in conjunction with apparatus such as that disclosed in Patent No. 1,219,709 to Danner, issued March 20, 1917, entitled "Apparatus for Forming Molten Material in Cylindrical Form." In such apparatus a supply stream of molten glass flows downwardly onto a continuously rotating downwardly-inclined tapered mandrel and either rod, regular tubing or capillary tubing is continuously drawn from the lower discharge end of the mandrel. The working portion of the mandrel as well as the flowing supply stream and deposited glass surrounding the working portion of the mandrel are all enclosed in a heated chamber or muffle to control glass temperatures on the mandrel to obtain a uniform product as drawn.

Conventionally in the manufacture of glass rod or tubing as practiced by the Danner process, a tubular refractory sleeve is mounted on a metallic blowpipe which serves to permit the molten glass to flow downwardly therearound due to rotation of the mandrel as well as the action of gravity in combination with lengthwise drawing of the material therefrom in a substantially horizontal direction. In the making of tubing, the mandrel discharge end has a perforated tip which is employed as a blowpipe, and in the making of rod, an imperforate tip is utilized having a conical shape at its lower extremity. Whether the nosepiece be fabricated of metal or refractory material such as fireclay, in virtually all forms of the Danner process, the major exterior surfaces of the body portion of the mandrel have been comprised of inorganic refractory material such as a cast sleeve of fireclay.

Previously it has been observed that when certain molten glasses pass over such sleeve, outgassing of the refractory material, which comprises the major exterior surfaces of the mandrel has been found to cause the formation of small open blisters on and in the glass in contact with the sleeve. As this glass passes over the discharge end of the sleeve and is drawn distendingly therefrom, these blisters tend to become elongated and form open so-called "air-lines." Such defects or the occurrence of any incipient devitrification in drawn tubing makes the same objectionable for use as syringe cartridges, culture tubes, etc., which are normally fabricated from lengthy sections of high-quality tubing. Also, during a long-term campaign of forming a single tubular product, for example, having precisely-controlled internal and external diameters and truly cylindrical configuration, it has been observed that non-uniform wear of the mandrel refractory sleeve can cause both dimensional and shape variations in the product which must be corrected by modifying other variables where possible or by replacing the refractory sleeve. Such replacement involves a time-consuming operation, particularly in re-establishing proper thermally-balanced conditions within the muffle chamber. The temperature of the glass on the mandrel has been controlled by the temperature of the surrounding atmosphere within the enclosed muffle chamber. Fluctuations in glass temperature on the mandrel can occur which result in dimensional variations in the drawn product. The present invention obviates such temperature and dimensional variations.

Accordingly, it is an object of the present invention to overcome the above-noted deficiencies in glass drawing operations by the provision of a forming mandrel having substantially imperforate exterior surfaces in its cylindrical working region with at least one annular heating zone wherein the molten glass is internally heated.

Another object of this invention is to provide durable and long-lived apparatus which constitutes a novel rotary forming mandrel for continuously forming molten thermoplastic material into lengthy cylindrical contour in essentially defect-free condition, the mandrel having at least one pair of exposed annular electrodes for heating the molten glass therebetween.

Another object of this invention is to provide both apparatus and method for continuously drawing molten glass into various products having lengthy cylindrical contours by the use of a rotatable cylindrical mandrel having a series of at least two spaced-apart annular electrodes in its working region, which electrodes are capable of introducing Joule effect electrical energy into the molten glass to control its temperature to fabricate essentially defect-free uniform products.

A further object of this invention is to provide apparatus for continuously drawing molten glass in the form of lengthy rod or tubing having improved chemical and physical characteristics, said apparatus comprising a downwardly-inclined rotating mandrel having major glass-working surfaces which are fabricated of refractory insulating material and means including spaced electrodes for internally heating the molten glass on said mandrel to maintain the same at a precisely-controlled thermal and viscosity level.

A still further object of this invention is to provide an improved method of drawing various glass products, such as rod or tubing, all having lengthy cylindrical contours utilizing a unitary forming mandrel which has imperforate non-conducting refractory external surfaces and a series of annular electrical heating elements mounted contiguous with said refractory external surfaces adjacent the glass-receiving zone of the mandrel to facilitate long-term drawing operations of an individual product having prescribed uniform characteristics.

The specific nature of this invention, as well as other objects and advantages thereof, will become apparent to those skilled in the art from the following detailed description, taken in conjunction with the annexed sheets of drawings on which, by way of preferred example only, are illustrated the preferred embodiments of this invention.

The present invention is particularly well adapted for use in connection with the apparatus disclosed in the above-identified patent to Danner, and the attached drawings indicate a preferred form of novel apparatus incorporated therein to accomplish the purposes set forth above. The apparatus is also applicable for use with other drawing processes and apparatus wherein various diverse types of lengthy cylindrical glass products are formed by drawing molten glass downwardly or upwardly from the discharge end of a stationary or rotating forming mandrel.

Figure 1:
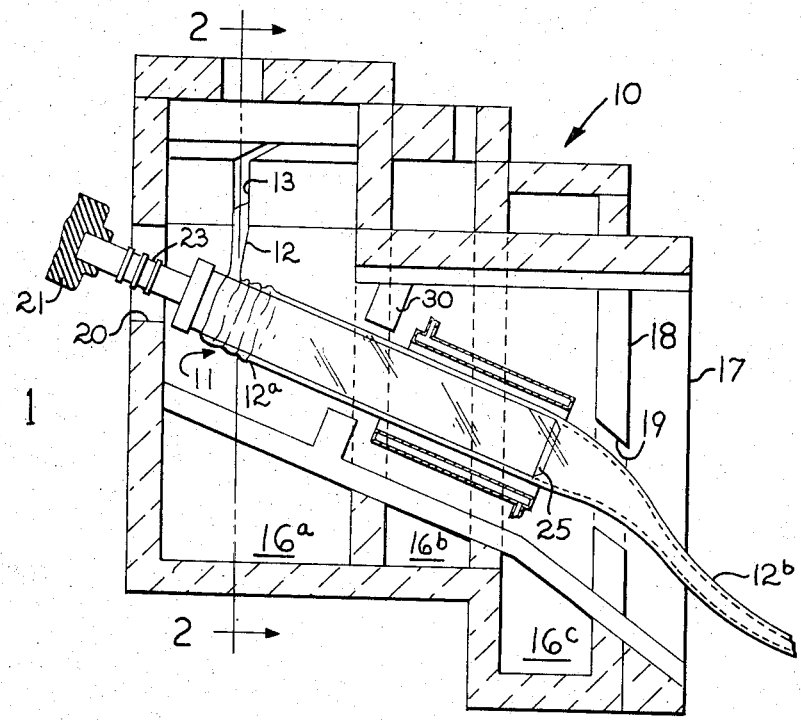
FIG. 1 is a vertical sectional view illustrating a rotating forming mandrel in one embodiment of the present invention incorporated in conventional glass drawing apparatus.
Figure 2:
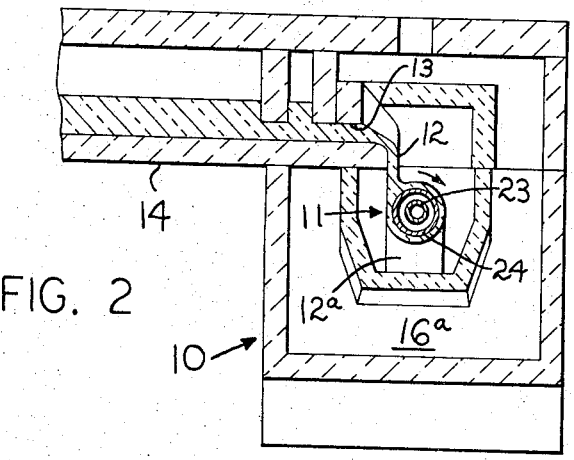
FIG. 2 is a vertical sectional view of reduced proportions taken along the line 2—2 of FIG. 1.

In accordance with FIG. 1, a muffle or chamber 10 encloses the usual downwardly-inclined rotating mandrel 11 upon the external surfaces of which molten glass flows, delivered thereonto in the form of a supply stream 12 from a delivery trough 13 positioned at the terminating end of a glass conveying forehearth 14. Obviously the above-described elements can be varied widely as known in the art and may or may not consist of conventional structures.

Molten glass stream 12 is continuously deposited on rotating mandrel 11 and smoothly flows over its basically cylindrical surfaces in a helical and then cylindrical pattern 12a and subsequently in a frusto-conical pattern egressing from its discharge end. The glass is drawn in a constricting manner in catenary form 12b from the discharge end of mandrel 11 at prescribed drawing rates into cylindrical form comprising rod or tubing as set forth hereinbelow.

Forming chamber or muffle 10 which is normally fabricated or lined with refractory material is surrounded by a plurality of annular heating chambers 16a, 16b and 16c which contain gas flames and/or products of combustion from burner fires to maintain uniform elevated temperatures within the chamber.

The discharge end 17 of the muffle from which the glass product is drawn is preferably closed by a baffle 18 having a relatively small opening 19 through which the glass product is drawn.

Mandrel 11 is mounted in downwardly-inclined cantilevered relation projecting through an opening 20 in the muffle chamber. The mandrel is rotatingly mounted exteriorly of the chamber and driven at a uniform rate of rotation by any one of various types of known driving apparatus designated by the numeral 21 such as an electric motor and gear reduction box of the mechanism shown in the Danner patent.

Central blowpipe or body portion 23 of the mandrel which is normally fabricated of metal projects within the heated chamber and is surrounded by a lengthy cylindrical-shaped sleeve-like refractory member 24 having a slightly tapering lower extremity 25. The terminating end 25 of the mandrel is provided with an axial opening 26 to facilitate drawing regular or capillary tubing. Alternately a conically-shaped nosepiece having imperforate surfaces is employed to draw solid rod or cane therefrom. As shown in FIG. 1, molten glass 12a which is deposited on the mandrel is drawn therefrom in the form of tubing 12b. The deformable tubing as it leaves the drawing chamber 10 forms a catenary curve and is then drawn horizontally into solidified rigid form.

Figure 3:
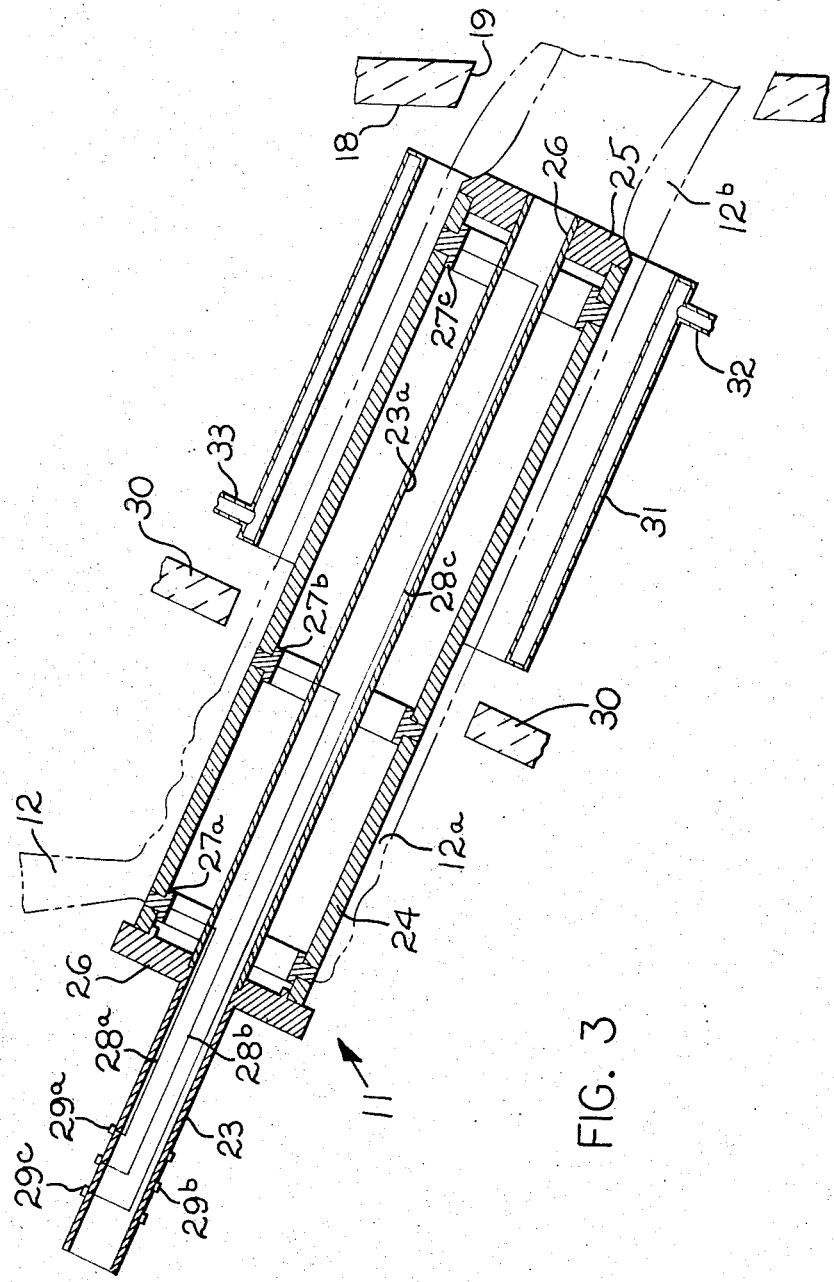
FIG. 3 is an enlarged vertical sectional view of the rotary forming mandrel only, fabricated in accordance with the present invention.

As shown in FIG. 3, mandrel 11 consists essentially of a body portion or blowpipe 23, which is essentially a metallic tubular shaft having an axial opening extending throughout its length. Cylindrical refractory sleeve 24 which is comprised of several segments of uniform diameter is mounted on mandrel blowpipe 23 between the frusto-conical shaped lower nose portion 25 and a flange member 26 mounted on an upper region. Segmented refractory sleeve 24 is mounted on central shaft 23 with a series of three annular electrodes 27 interposed therebetween. The uppermost electrode 27a is mounted adjacent the region where glass stream 12a is deposited on the mandrel. A second electrode 27b is mounted in an intermediate region spaced apart from electrode 27a. A third electrode 27c is mounted in spaced relation from intermediate electrode 27b, the third electrode being disposed adjacent the delivery end of the mandrel.

Individual electrical leads 28a, 28b and 28c interconnect each of the electrodes 27a, 27b and 27c with an individual slip ring 29a, 29b and 29c respectively at the upper supported end of the mandrel. Slip ring 29a, b and c are adapted to be contacted by a commutator to supply electrical energy to the electrodes 27a, b and c.

A baffle member 30 having an opening therein is mounted to surround an intermediate region of the mandrel adjacent central electrode 27b. The invention of utilizing a baffle member surrounding an intermediate area of the mandrel is disclosed and claimed in copending application Serial No. 460,004, filed June 1, 1965, in the name of Calvin M. Green, which application is owned by the same assignee as the present application. Annular electrodes 27a, b and c have their surfaces exteriorly exposed substantially flush with the surfaces of non-electroconductive refractory material 24. The electrodes are preferably comprised of essentially non-oxidizing material which is capable of withstanding the flow of molten glass thereover. The electrodes may be comprised of platinum, platinum-rhodium alloy, nickel-chromium alloy or other materials, all of which are resistant to molten glass at elevated temperatures.

The electrodes are preferably comprised of an alloy such as 90% platinum and 10% rhodium by weight and have an essentially T-shaped cross-sectional contour as shown in FIG. 3 to support the terminating edges of the refractory sleeve.

The annular electrodes serve to provide Joule effect electrical current flow to the molten glass therebetween. The glass between electrodes 27a and 27b is normally hotter and has a lower viscosity. The lower portion of the mandrel between electrodes 27b and 27c is surrounded by cooling jacket 31 having a diameter substantially greater than the glass-bearing mandrel. Jacket 31 is cooled by a stream of water delivered by means of inlet and outlet lines 32 and 33. Electrical energy is passed between electrodes 27b and 27c to heat the glass therebetween by Joule effect current while the surrounding water jacket 31 serves to cool the glass to the required level, the combined heating and cooling effectively providing precise control of glass temperature prior to its egress from the terminating end of the mandrel.

An electrical commutator structure (not shown) is utilized to provide electrical energy to slip rings 29a, b and c which in turn are connected to electrodes 27a, b and c. When a prescribed amount of electrical current is supplied to the upper pair of electrodes 27a and 27b, the temperature of the molten glass therebetween is controlled by passage of electrical current therethrough to elevate the glass temperature and eliminate the wrap marks of the molten glass created by delivery of the glass stream onto the mandrel. In certain types of conventional glasses such as soda-lime and modified borosilicates, the glass temperature between electrodes 27a and 27b should be maintained within the temperature range of from 2100° to 2400° F. Electrical potential is also maintained between annular electrodes 27b and 27c to pass electrical current through the glass surrounding this region immediately prior to its downward egress from terminating end 25 of the mandrel. The amount of power applied between electrodes 27a and 27b is normally greater than that applied between electrodes 27b and 27c, the molten glass serving as the conductor therebetween. Joule effect current is thereby passed through and serves to heat the glass.

Drawing of a cylindrical glass product in accordance with the present invention may be summarily described as follows:

With mandrel 11 mounted in downwardly-inclined fully-assembled relation, a supply stream 12 of molten glass is deposited on an upper portion of the mandrel adjacent upper electrode 27a. The glass flows downwardly onto and around the mandrel during its rotation as a workable cylindrical body 12a called a "wrap" and is drawn from the lower end of the mandrel lengthwise either in tubular or rod-like form having a basically cylindrical contour. In drawing a solid glass product, a mandrel nose piece having a conical shape with imperforate surfaces is employed. In drawing various sizes of tubing, the terminating end of the mandrel consists of a short frusto-conical portion having an axial opening to control the internal pressure within the tubular product as drawn. In making capillary tubing, reduced pressure less than atmospheric is employed, while in making regular tubing, the atmosphere internally of the tube is maintained slightly greater than atmospheric by introducing low pressure blowing air.

The present method consists of rotating downwardly-inclined forming mandrel 11 within heating chamber 10 at a uniform speed of rotation and delivering a continuous stream of molten glass onto the mandrel while drawing the glass product into uniform cylindrical contour from the mandrel discharge end.

In accordance with the present invention, the mandrel is provided with at least one, and preferably two, heating zones wherein the molten glass thereon is internally heated by Joule effect electrical current preferably throughout the glass-contacting region of the mandrel. At least two annular zones of electrical heating are utilized as shown in FIG. 3, the temperature of the upper zone being maintained at a higher level to ensure smooth formation of the glass into cylindrical form and in the lower zone to maintain the glass at the proper elevated temperature with respect to its liquidus temperature to facilitate uniform drawing with minimal devitrification of the glass.

Obviously, various sizes of rod and tubing are capable of being drawn by precise control of known variants such as angle of inclination of the mandrel, glass temperatures and composition, and atmospheric temperatures within the muffle chamber as well as drawing rates. In accordance with this invention, the glass is internally heated while in residence on the mandrel to more accurately control its viscosity for improved drawing.

Various modifications may be resorted to within the spirit and scope of the appended claims.

I claim:

1. In an apparatus for drawing molten glass in cylindrical form,
   a hollow chamber,
   means for heating said chamber,
   a rotary cylindrical mandrel mounted in downwardly-inclined relation within said chamber from which the cylindrical product of molten glass is drawn,
   means for continuously flowing a stream of molten thermoplastic material onto and around said mandrel,
   said mandrel having a circular cross-sectional contour, the major glass-contacting exterior surfaces of said mandrel being comprised of electrically-insulating refractory material,
   at least a pair of exteriorly exposed annular electrodes mounted in spaced alignment smoothly integral with the exterior surfaces of said mandrel,
   and means for supplying electrical energy to said annular electrodes to pass electrical current through the molten glass therebetween.

2. In an apparatus for drawing glass in cylindrical form,
   a hollow chamber,
   means for heating said chamber,
   a rotary cylindrical mandrel mounted in downwardly-inclined relation within said chamber from which glass tubing or rod is drawn,
   means for continuously flowing a stream of molten glass onto and around said mandrel,
   the major exterior surfaces of said mandrel being comprised of heat-resistant non-electroconductive refractory material,
   at least a pair of annular metallic electrodes mounted in spaced alignment on said mandrel with surfaces exteriorly exposed,
   and means for supplying electrical energy to said annular electrodes to pass electrical current through the molten glass therebetween.

3. Apparatus for drawing glass in cylindrical form in accordance with claim 2, wherein
   a series of three annular electrodes are mounted in spaced relation with electrical connections to each pair extending through the interior of said mandrel.

4. Apparatus for drawing glass in cylindrical form in accordance with claim 2, wherein
   the exteriorly-exposed surfaces of said annular electrodes are substantially flush with the surfaces of non-electroconductive refractory material of said mandrel, said mandrel having substantially uniform smooth cylindrical surfaces through the major portion of its length.

5. Apparatus for drawing glass in cylindrical form in accordance with claim 2, wherein
   said means for supplying electrical energy to said annular electrodes comprises a source of electrical power with leads extending interiorly of said mandrel connecting with said electrodes.

6. Apparatus for drawing glass in cylindrical form in accordance with claim 2, wherein
   said mandrel is comprised of segmented tubular sections of fire clay and said annular metallic electrodes are comprised of noble metal.

References Cited

UNITED STATES PATENTS

| | | | |
|---|---|---|---|
| 848,422 | 3/1907 | Wynne | 65—128 |
| 2,972,837 | 2/1961 | Pinotti | 65—184 |
| 3,219,426 | 11/1965 | Steer | 65—89 |
| 3,236,619 | 2/1966 | Frye et al. | 65—89 |

DONALL H. SYLVESTER, *Primary Examiner.*

G. R. MYERS, *Assistant Examiner.*